United States Patent

[11] 3,592,266

| [72] | Inventor | John M. Tinsley |
| | | Duncan, Okla. |
| [21] | Appl. No. | 810,146 |
| [22] | Filed | Mar. 25, 1969 |
| [45] | Patented | July 13, 1971 |
| [73] | Assignee | Halliburton Company |
| | | Duncan, Okla. |

[54] METHOD OF FRACTURING FORMATIONS IN WELLS
21 Claims, 14 Drawing Figs.

[52] U.S. Cl. .................................................. 166/283, 166/308
[51] Int. Cl. .................................................. E21b 43/26
[50] Field of Search ......................................... 166/283, 308, 280

[56] References Cited
UNITED STATES PATENTS

| 2,596,844 | 5/1952 | Clark | 166/308 UX |
| 2,645,291 | 7/1953 | Voorhees | 166/280 X |
| 2,668,098 | 2/1954 | Alm | 166/308 UX |
| Re23,733 | 11/1953 | Farris | 166/283 |
| 2,825,409 | 3/1958 | Ring | 166/283 |
| 2,935,129 | 5/1960 | Allen et al. | 166/283 X |
| 2,965,172 | 12/1960 | Da Roza | 166/308 |
| 3,179,172 | 4/1965 | Reed et al. | 166/283 |
| 3,378,073 | 4/1968 | Savins | 166/308 |

*Primary Examiner*—Ian A. Calvert
*Attorney*—Dunlap, Laney, Hessin & Dougherty

ABSTRACT: The present invention is directed to a method for fracturing a subterranean formation penetrated by a well bore, the fracturing being accomplished by alternately injecting into said formation a high-viscosity non-Newtonian fluid and a low-viscosity Newtonian fluid. The low-viscosity fluid carries propping agents into the fracture if a wide fracture having a relatively small radius and a layered proppant configuration is desired, and the high-viscosity fluid carries propping agents into the formation if narrow fractures having a relatively large radius and a high permeability are desired.

PATENTED JUL 13 1971

INVENTOR.
JOHN M. TINSLEY
BY
Dunlap, Laney, Hessin & Dougherty
ATTORNEYS

PATENTED JUL 13 1971 3,592,266

INVENTOR
JOHN M. TINSLEY
BY
Dunlap, Laney, Hessin & Dougherty
ATTORNEYS

METHOD OF FRACTURING FORMATIONS IN WELLS

BACKGROUND OF THE INVENTION

1. Field of the Invention

The present invention relates generally to methods of fracturing formations in wells, and more particularly, but not by way of limitation, to methods of hydraulically fracturing and propping a formation in a well wherein, after the formation is initially fractured, quantities of high-viscosity non-Newtonian fluid and a low viscosity nondiluting fluid are successively injected into the fracture to open the fracture and place propping agent therein.

2. Description of the Prior Art

Oil and gas accumulations usually occur in porous and permeable underground rock formations. In order to produce the oil and gas contained in the formation, a well is drilled into the formation. The oil and gas may be contained in the porosity or pore space of the formation, hydraulically connected by means of permeability or interconnecting channels between the pore spaces. After the well is drilled into the formation, oil and gas are displaced to the well bore by means of fluid expansion, natural or artificial fluid displacement, gravity drainage, capillary expulsion, etc. These various processes may work together or independently to drive the hydrocarbons into the well bore through existing flow channels. In many instances, however, production of the well may be impaired by drilling fluids that enter into and plug the flow channels, or by insufficient natural channels leading into the particular bore hole. Either case may result in a noncommercial well because of low-permeability effect. The problem then becomes one of treating the formation in some manner which will increase the ability of the formation rock to conduct fluid into the well.

Many various methods of hydraulically fracturing formations in wells to increase the conductivity of the formations have been developed. Hydraulic fracturing may be defined as the process in which fluid pressure is applied to the exposed formation rock until failure or fracturing occurs. After failure of the formation rock, a sustained application of fluid pressure extends the crevice or fracture outward from the point of failure. This fracture creates new and larger flow channels. Commonly, once the fracture has been created, selected grades of propping agents are then added to the fracturing fluid in various quantities and placed in the fractures to support and hold the fracture open. The propping agent is usually placed in the fracture at a pressure equal to or greater than the pressure required to initially fracture the formation. Once the propping agent has been placed and the pressure removed from the formation, the fractures in the formation will tend to close due to overburden pressures in the formation, but are held open by the propping agent.

Prior to the present invention, many problems have been encountered in placing a propping agent in a fracture after it has been formed. These problems generally relate to the fact that once a fracture has been formed in a formation, injection of additional fluid into the fracture tends to lengthen the fracture. When a propping agent is carried into the fracture with the fracturing fluid, and allowed to settle therein, a very thin continuous layer of the propping agent will be formed. Consequently, when the pressure exerted on the formation is reduced, the fracture will close on the thin layer of propping agent leaving only a thin or narrow low-capacity fracture through which the oil and gas contained in the formation must travel.

The present invention provides a method of fracturing a formation and selectively placing relatively thick layers of propping agent therein. The propping agent may be placed either at a controlled distance from the well bore or in successive areas along the length of the fracture. When the pressure on the formation is reduced a relatively wide high-capacity fracture will remain.

SUMMARY OF THE INVENTION

The present invention relates to a method of fracturing a formation in a well comprising the steps of injecting a quantity of fluid into the formation at the formation fracture pressure to form a fracture therein, injecting a quantity of high-viscosity non-Newtonian fluid into said fracture at a pressure equal to or greater than said fracture pressure, injecting a quantity of nondiluting low-viscosity fluid containing a propping agent into said fracture at a pressure equal to or greater than said fracture pressure so that said fracture is widened and lengthened, allowing said propping agent to settle in said fracture at said fracture pressure thereby forming a layer of propping agent therein and reducing the pressure exerted on said formation.

It is, therefore, a general object of the present invention to provide a method of fracturing formations in wells.

A further object of the present invention is the provision of a method of fracturing a formation wherein a relatively wide high-capacity fracture is formed therein.

It is a further object of the present invention to provide a method of forming a fracture in a formation wherein successive layers of propping agent may be placed in the fracture at a controlled distance from the well bore.

Yet further object of the present invention is the provision of a method of fracturing a formation wherein a high-capacity fracture may be formed of relatively great length.

Still a further object of the present invention is the provision of a method of forming a high-capacity fracture in a formation wherein a minimum quantity of propping agent is required.

Other objects and advantages of the invention will be evident from the following detailed description when read in conjunction with the accompanying drawings.

DESCRIPTION OF THE PREFERRED EMBODIMENTS

Figure 1:
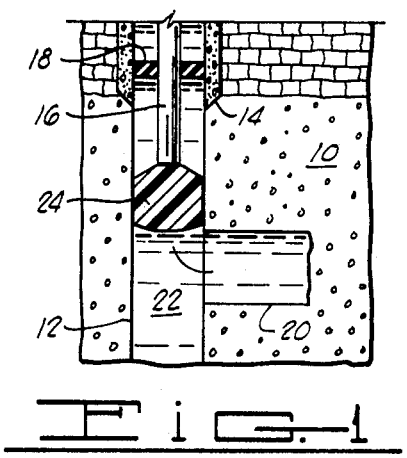
FIG. 1 is a view of a formation in a well after it has been initially fractured.

It has been discovered that when quantities of a high-viscosity nontNewtonian fluid are injected into a fracture in a formation after the fracture has been initially formed, hydraulic properties of the non-Newtonian fluid will bring about widening of the fracture. Furthermore, it has been found that when a quantity of a high-viscosity non-Newtonian fluid is injected into an initially formed fracture in a formation, followed by a quantity of a low-viscosity nondiluting fluid carrying a propping agent, the fracture in the formation will be wedged open by the non-Newtonian fluid while the propping agent is placed in the fracture by the low-viscosity fluid. By injecting successive quantities of a high viscosity non-Newtonian fluid and a nondiluting low-viscosity fluid carrying propping agent, successive layers of the propping agent can be placed in the fracture at a controlled distance from the well bore, thereby forming a high-capacity fracture when the pressure on the formation is reduced. Also, it has been found that high-capacity fractures of great length may be formed by injecting successive quantities of a high-viscosity non-Newtonian fluid carrying a propping agent and a low-viscosity fluid into an initially formed fracture in a well formation.

Examples of high-viscosity non-Newtonian fluids which may be employed in the present invention are water gels, hydrocarbon gels and hydrocarbon-in-water or, optionally, water-in-hydrocarbon emulsions. Suitable water gels may be formed by combining water with natural gums, carboxymethyl, cellulose, carboxymethyl hydroxy ethyl cellulose, polyacrylamide and starches. Chemical complexes of the above compounds formed through chemical cross-linking may also be employed in the present invention. Such complexes may be formed with various metal complexers such as borate, copper, nickel and zirconium. Other chemical complexes of the above materials may be used which are formed by organic complexers such as hexamethoxymethylmelamine.

Examples of hydrocarbon gels which may be employed in the present invention are those gels which are formed when a hydrocarbon liquid such as kerosene is combined with metallic soaps, polyisobutylene poly alkyl styrene, isobutyl acrylate, isobutyl methacrylate and aluminum soaps.

As will be understood by those skilled in the art, many other highly viscous non-Newtonian types of materials may be employed in the present invention. These materials may behave as either plastic fluids or pseudoplastic fluids. Plastic fluids will require some stress which must be exceeded before flow starts. Pseudoplastic fluids, although having no defined yield point, will yield high apparent viscosities at low shear rates in laminar flow.

A pseudoplastic fluid having thixotropic properties is particularly suitable for use in the present invention. Thixotropy may be defined as the property or phenomenon exhibited by some gels, whereby the gels become fluid when stressed, and the change is reversible. The apparent viscosity of this type of fluid depends not only on the rate of shear, but also on the time over which the shear has been applied. Since thixotropy is a reversible process, a highly viscous gel structure is obtained when the fluid moved and agitated.

Examples of low-viscosity fluids suitable for use in the present invention are water and low-viscosity hydrocarbon fluids. It is preferable to the present invention that the low-viscosity fluid used by contiguous but not mixed with the high-viscosity non-Newtonian fluid used. That is, if a hydrocarbon gel is used as the high-viscosity non-Newtonian fluid, water or other nondiluting low-viscosity fluid may be used. If a gel is employed as the high-viscosity non-Newtonian fluid of the present invention, the fluid used to form the gel may be employed as the low-viscosity fluid of the present invention if the gel will not be diluted by the low-viscosity fluid after it has formed.

Referring now to the drawings, particularly FIGS. 1 through 8, let it be assumed it is desirable to fracture a formation 10 into which a well bore 12 has been drilled. A conventional cement or steel casing 14, and a conventional string of tubing 16 is disposed within the well bore. A conventional packer 18 is set between tubing 16 and casing 14 to prevent fluids from entering the annulus between the casing and the tubing.

Referring to FIG. 1, the formation 10 is initially fractured by applying pressure on its exposed surfaces with a fracturing fluid 22 until failure results. Upon failure, a vertical fracture 20 is formed in the formation 10. Any conventional fracturing fluid may be used for accomplishing initial fracture of the formation 10.

Figure 2:
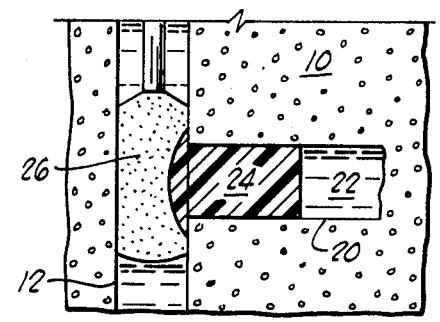
FIG. 2 is a view of the formation of FIG. 1 after a high-viscosity non-Newtonian fluid of the present invention has been injected in the fracture formed therein.

After fracture 20 is formed in the formation 10, a quantity of high-viscosity non-Newtonian fluid 24 of the present invention is pumped into the fracture 20 at a pressure equal to or greater than the pressure required to initially fracture the formation 10 (FIG. 2). If a gel or thixotropic fluid is employed, injection may be stopped for a period of time while pressure is maintained on the formation 10 in order to allow the gel to set.

Figure 3:
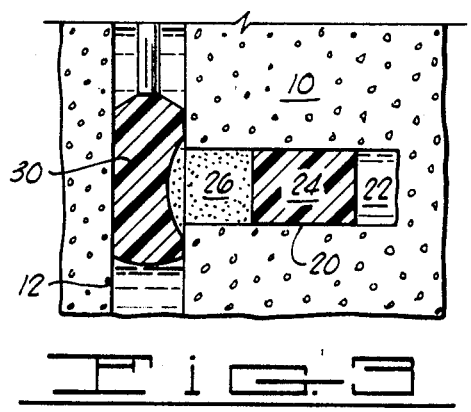
FIG. 3 is a view of the formation of FIG. 1 after a low-viscosity fluid of the present invention carrying a propping agent has been injected in the fracture formed therein.
Figure 4:
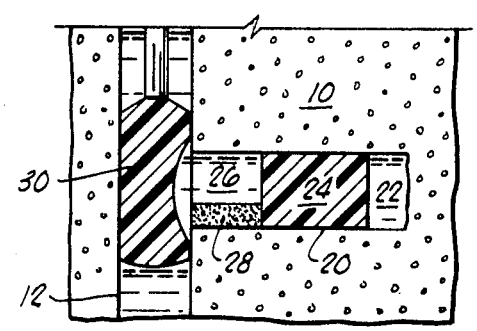
FIG. 4 is a view of the formation of FIG. 1 after the propping agent has settled in the fracture.
Figure 5:
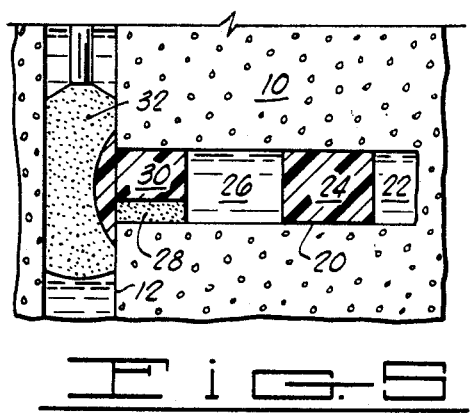
FIG. 5 is a view of the formation of FIG. 1 after an additional quantity of high-viscosity non-Newtonian fluid has been injected in the fracture.

A low-viscosity fluid 26 of the present invention carrying a propping agent such as sand, walnut hulls, glass beads, etc., is then pumped into the fracture 20 (FIG. 3). Since the low-viscosity fluid 26 is nondiluting to the high-viscosity non-Newtonian fluid 24, the non-Newtonian fluid 24 will be forced further into the fracture 20. As a result, the fracture 20 will be widened and lengthened. After the desired quantity of low-viscosity fluid 26 carrying propping agent is injected into the fracture 20, injection is stopped and the pressure maintained at a level which will maintain the fracture 20 open. The propping agent will settle to the bottom of fracture 20 during this time (FIG. 4) thereby forming a layer of propping agent 28 therein.

Figure 6:
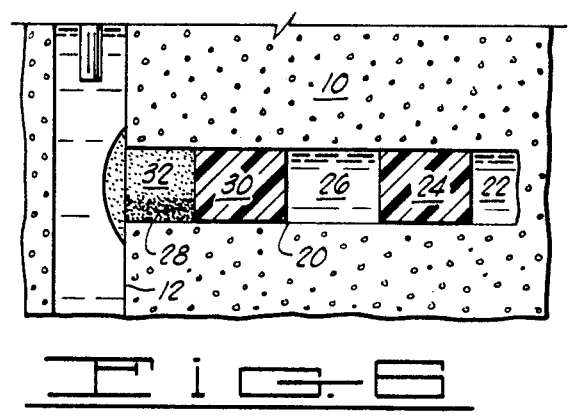
FIG. 6 is a view of the formation of FIG. 1 after an additional quantity of the low-viscosity fluid containing a propping agent has been injected in the fracture.
Figure 7:
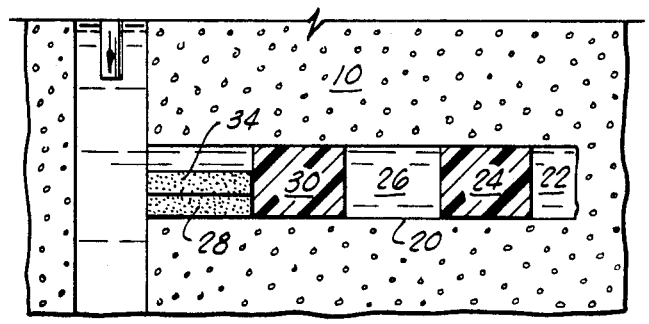
FIG. 7 is a view of the formation of FIG. 1 after additional propping agent has settled in the fracture.
Figure 8:
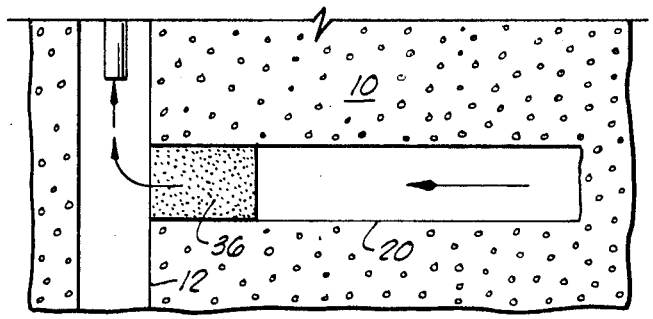
FIG. 8 is a view of the formation of FIG. 1 after the pressure exerted on the formation has been reduced.

An additional quantity 30 of the high-viscosity non-Newtonian fluid is then pumped into the fracture 20 (FIG. 5), and an additional quantity 32 of the low-viscosity fluid carrying propping agent is pumped into the fracture 20 (FIG. 6). The fracture 20 will be further widened and lengthened as the additional high-viscosity non-Newtonian fluid and low-viscosity fluid are injected therein. Injection is again stopped while maintaining adequate pressure on the formation to keep the fracture 20 open. While injection is stopped an additional layer 34 of the propping agent will settle in the fracture 20 on top of the layer 28 previously formed (FIG. 7). Additional quantities of high-viscosity non-Newtonian fluid and low-viscosity fluid carrying propping agent may be injected into fracture 20 until a composite layer 36 of propping agent of the desired height is formed as illustrated in FIG. 8.

Once placement of the propping agent has been completed, injection may be stopped and the well shut in. The pressure may then be reduced on the formation 10 by slowly opening the well and bleeding off fluids contained therein. During this step, the fracture 20 in formation 10 will close due to overburden pressures exerted on the formation 10 until it is held open by the propping agent as illustrated in FIG. 8. As the pressure is reduced, oil and gas contained within the formation 10 will be conducted through the fracture 20 towards the well bore, and quantities of fluids 22, 24, 26, 30 and 32 will be conducted out of the fracture 20 leaving only the propping agent therein. Thus, a wide high-capacity fracture 20 is formed.

As will be understood by those skilled in the art, the composite layer 36 of propping agent may be formed in the fracture 20 at any desired distance from the well bore 12 by coordinating the volumes of high-viscosity and low-viscosity fluids injected into the fracture 20. When injection is stopped, the propping agent will settle out of the low-viscosity fluid in the desired placement area.

Figure 9:
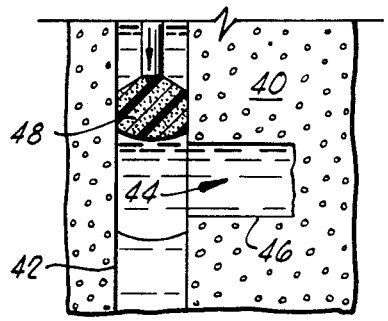
FIG. 9 is a view of a formation in a well after it has been initially fractured.
Figure 10:
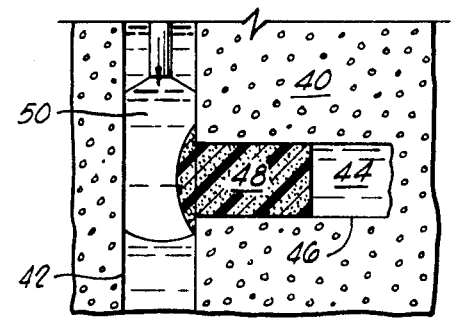
FIG. 10 is a view of the formation of FIG. 9 after a high-viscosity non-Newtonian fluid carrying a propping agent has been injected in the fracture formed therein.
Figure 11:
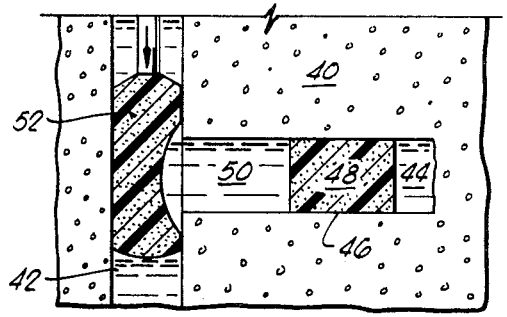
FIG. 11 is a view of the formation of FIG. 9 after a low-viscosity fluid has been injected in the fracture.
Figure 12:
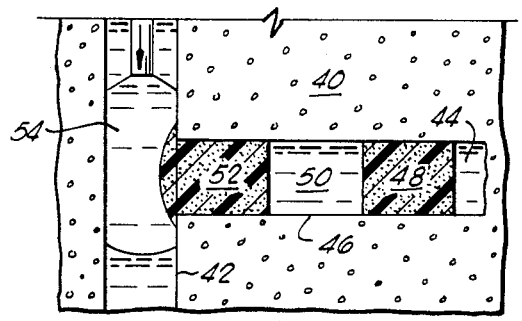
FIG. 12 is a view of the formation of FIG. 9 after an additional quantity of high-viscosity non-Newtonian fluid carrying a propping agent has been injected in the fracture.
Figure 13:
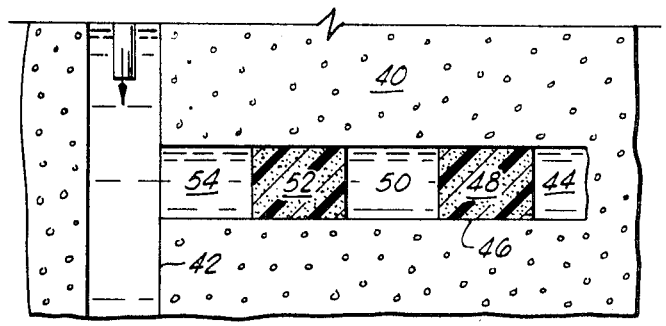
FIG. 13 is a view of the formation of fig. 9 after an additional quantity of low-viscosity fluid has been injected in the fracture.
Figure 14:
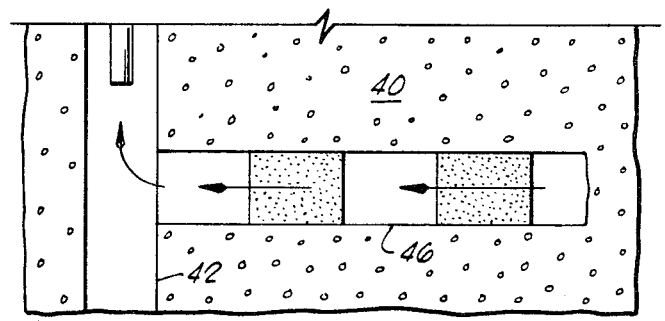
FIG. 14 is a view of the formation of FIG. 9 after the pressure exerted on the formation has been reduced.

If it is desirable to form a long high-capacity fracture in a formation, an alternate form of the method of the present invention may be employed. Referring to FIGS. 9 through 14 let it be assumed that a long high-capacity fracture is to be formed in a formation 40 into which well bore 42 has been drilled. The formation 40 is fractured by applying pressure on the exposed formation surfaces using a conventional fracturing fluid 44 (FIG. 9). Fracture 46 is formed in the formation 40. A quantity 48 of high-viscosity non-Newtonian fluid carrying a propping agent is pumped into the fracture 46 (FIG. 10). If the non-Newtonian fluid utilized is of the type where a gel or high apparent viscosity is produced during static periods, injection may be stopped for a period of time sufficient for the desired properties to be obtained. A quantity 50 of low-viscosity nondiluting fluid of the present invention is then pumped into the fracture 46 (FIG. 11) causing the non-Newtonian fluid preceding it to carry the propping agent outwardly in the fracture 46 and at the same time lengthen and widen it. An additional quantity 52 of high-viscosity non-Newtonian fluid carrying propping agent is then injected into the fracture 46 (FIG. 12). An additional quantity 54 of low-viscosity nondiluting fluid is injected into the fracture 46 moving the previously injected quantities of non-Newtonian fluid and propping agent further into the fracture 46 thereby lengthening and widening it further. Additional quantities of the high-viscosity non-Newtonian fluid carrying propping agent and the low-viscosity fluid may be pumped into the fracture 46 until a fracture of the desired length is created. Injection may then be stopped, the well shut in and the pressure reduced on the well in the same manner as previously described. The quantities 44, 48, 50, 52 and 54 of the fluids of the present invention will be forced out of the fracture 46 as the pressure is reduced leaving propping agent in the fracture 46 as shown in FIG. 14. It should be noted that if a high-viscosity non-Newtonian fluid which will form a gel is used for carrying the propping agent into the fracture 46, an internal gel breaker may be included in the fluid to break the gel formed after the pressure is reduced on the well.

The fracture 46, thus formed, will have a high fluid-conducting capacity due to the controlled placement of propping agent in successive areas throughout the length of fracture 46. Since open spaces are left between the areas of fracture 46 containing propping agent, the overall conductivity of the fracture 46 will be much greater than a fracture having propping agent distributed throughout its entire length. Also, the method of the present invention brings about the formation of a high-capacity fracture using a minimum quantity of propping agent.

As will be understood by those skilled in the art, the particular quantities of the high-viscosity non-Newtonian fluid and the low-viscosity fluid used will depend upon the type of formation being treated, the length of fractures desired in the formation, and the width and capacity of fractures desired. The particular type of high-viscosity non-Newtonian fluid, low-viscosity fluid and propping agent used will also depend on the type of fracture desired, etc.

The present invention, therefore, is well adapted to carry out the objects and attain the ends and advantages mentioned, as well as those inherent therein. While presently preferred embodiments of the invention are given for the purpose of disclosure, numerous changes can be made which will readily suggest themselves to those skilled in the art, and which are encompassed within the spirit of the invention disclosed herein.

What I claim is:

1. The method for placing propping agents in a fracture in a subterranean formation in a layered configuration comprising the steps of:

injecting a quantity of high-viscosity non-Newtonian fluid into said fracture at a pressure equal to or greater than the pressure required to form said fracture;

injecting a quantity of low-viscosity fluid which will not dilute said non-Newtonian fluid and which carries a propping agent into said fracture at a pressure equal to or greater than said pressure required to form said fracture so that said fracture is widened and lengthened;

allowing said propping agent to settle in said fracture at said pressure required to form said fracture, thereby forming a layer of propping agent in said fracture; and reducing the pressure exerted on said formation.

2. The method of claim 1 which is further characterized to include, prior to the final step of reducing the pressure exerted on said formation, the additional steps of:

injecting additional quantities of said high-viscosity non-Newtonian fluid into said fracture at a pressure equal to or greater than said pressure required to form said fracture;

injecting additional quantities of said low-viscosity fluid containing propping agents into said fracture at a pressure equal to or greater than said pressure required to form said fracture;

allowing said propping agent to settle in said fracture, thereby forming additional layers of said propping agent on top of said layer of propping agent previously placed in said fracture.

3. The method of claim 1 wherein said high-viscosity non-Newtonian fluid is selected from the group consisting of a water gel, a hydrocarbon-in-water emulsion, a water-in-hydrocarbon emulsion, and a hydrocarbon gel.

4. The method of claim 1 wherein said high-viscosity non-Newtonian fluid exhibits thixotropic properties.

5. The method of claim 1 wherein said low-viscosity fluid is water.

6. The method of claim 1 wherein said low-viscosity fluid is a hydrocarbon liquid.

7. The method of claim 1 which is further characterized to include the step of allowing said high-viscosity non-Newtonian fluid to rest for a period of time after each quantity is injected into said fracture.

8. In the process of fracturing a subterranean formation traversed by a well bore comprising the step of:

injecting a quantity of fluid into said formation with sufficient speed and pressure to form a fracture therein;

the improvement of placing proppants in said fracture in a layered configuration which comprises the additional steps of, injecting a quantity of high-viscosity non-Newtonian fluid into said fracture at a pressure equal to or greater than the pressure required to form said fracture;

injecting a quantity of low-viscosity fluid which will not dilute said non-Newtonian fluid and which carries a propping agent into said fracture at a pressure equal to or greater than said pressure required to form said fracture so that said fracture is widened and lengthened;

allowing said propping agent to settle in said fracture at said pressure required to form said fracture, thereby forming a layer of propping agent in said fracture; and reducing the pressure exerted on said formation.

9. The improvement of claim 8 which is further characterized to include, prior to the final step of reducing the pressure exerted on said formation, the additional steps of:

injecting additional quantities of said high-viscosity non-Newtonian fluid into said fracture at a pressure equal to or greater than said pressure required to form said fracture;

injecting additional quantities of said low-viscosity fluid containing propping agents into said fracture at a pressure equal to or greater than said pressure required to form said fracture;

allowing said propping agent to settle in said fracture, thereby forming additional layers of said propping agent on top of said layer of propping agent previously placed in said fracture.

10. The improvement of claim 8 wherein said high-viscosity non-Newtonian fluid is selected from the group consisting of a water gel, a hydrocarbon-in-water emulsion, a water-in-hydrocarbon emulsion, and a hydrocarbon gel.

11. The improvement of claim 8 wherein said high-viscosity non-Newtonian fluid exhibits thixotropic properties.

12. The improvement of claim 8 wherein said low-viscosity fluid is water.

13. The improvement of claim 8 wherein said low-viscosity fluid is a hydrocarbon liquid.

14. The improvement of claim 8 which is further characterized to include the step of allowing said high-viscosity non-Newtonian fluid to rest for a period of time after each quantity is injected into said fracture.

15. In the process of fracturing a subterranean formation traversed by a well bore comprising the step of:

injecting a quantity of fluid into said formation with sufficient speed and pressure to form a fracture therein;

the improvement of placing propping agents at random points throughout the fracture at various distances from the well bore to provide high permeability within the fracture comprising the additional steps of:

injecting a quantity of high-viscosity non-Newtonian fluid which carries a propping agent into said fracture at a pressure equal to or greater than the pressure required to form the fracture;

injecting a quantity of low-viscosity fluid which will not dilute with said non-Newtonian fluid into said fracture at a pressure equal to or greater than the pressure required to form the fracture so that said high-viscosity fluid carrying the propping agent is moved into the fracture away from the well bore; and reducing the pressure exerted on said formation.

16. The improvement of claim 15 which is further characterized to include, prior to the final step of reducing the pressure exerted on said formation, the additional steps of:

injecting additional quantities of said high-viscosity fluid containing propping agents into said fracture at a pressure equal to or greater than the pressure required to form the fracture; and injecting additional quantities of said low-viscosity fluid into said fracture at pressures equal to or greater than the pressure required to form the fracture, whereby said high-viscosity fluid containing the propping agents is moved into the fracture away from the well bore to form a highly permeable fracture supported at random points by propping agents.

17. The improvement of claim 16 wherein the high-viscosity non-Newtonian fluid is selected from the group consisting of a water gel, a hydrocarbon-in-water emulsion, a water-in-hydrocarbon emulsion, and a hydrocarbon gel.

18. The improvement of claim 16 wherein said high-viscosity non-Newtonian fluid exhibits thixotropic properties.

19. The improvement of claim 16 wherein said low-viscosity fluid is water.

20. The improvement of claim 16 wherein said low-viscosity fluid is a hydrocarbon liquid.

21. The method for forming a highly permeable fracture in a subterranean formation comprising the steps of:

injecting into said formation a high-viscosity non-Newtonian fluid carrying a propping agent at the pressure required to form a fracture in said formation, whereby said formation is fractured and proppant is carried into the fracture;

injecting a low-viscosity fluid which will not dilute with the high-viscosity fluid into the fracture formed by the high-viscosity fluid at a pressure equal to or greater than the pressure required to form the fracture so that the fracture is lengthened and the propping agent is carried into the fracture;

injecting additional quantities of the high-viscosity non-Newtonian fluid containing propping agents into the fracture at a pressure equal to or greater than the pressure required to form the fracture;

injecting additional quantities of said low-viscosity fluid into the fracture at a pressure equal to or greater than the pressure required to form the fracture so that the propping agent is carried into the fracture, thereby forming points of support throughout the fracture at various distances from the point of injection; and reducing the pressure exerted on said formation.